United States Patent
Uphus

(10) Patent No.: US 7,316,500 B2
(45) Date of Patent: *Jan. 8, 2008

(54) PIN EXTRUDER

(75) Inventor: Reinhard Uphus, Hannover (DE)

(73) Assignee: VMI - AZ Extrusion GmbH (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/580,208

(22) Filed: Oct. 12, 2006

(65) Prior Publication Data

US 2007/0097782 A1    May 3, 2007

(30) Foreign Application Priority Data

Oct. 12, 2005  (DE) .................. 10 2005 048 846

(51) Int. Cl.
*B29B 7/44* (2006.01)

(52) U.S. Cl. ........................... 366/80; 366/81

(58) Field of Classification Search ............. 366/77, 366/79, 80–85, 301, 318–324; 425/204, 425/208, 209
See application file for complete search history.

(56) References Cited

U.S. PATENT DOCUMENTS

| | | | | |
|---|---|---|---|---|
| 3,487,503 A | * | 1/1970 | Barr et al. ............ | 425/208 |
| 3,751,015 A | * | 8/1973 | Hensen et al. ............ | 366/81 |
| 4,491,417 A | * | 1/1985 | Hold et al. ............ | 366/90 |
| 5,267,847 A | * | 12/1993 | Bohm et al. ............ | 366/77 |
| 6,709,147 B1 | * | 3/2004 | Rauwendaal ............ | 366/80 |
| 2007/0097782 A1 | * | 5/2007 | Uphus ............ | 366/80 |
| 2007/0104815 A1 | * | 5/2007 | Uphus ............ | 425/208 |

FOREIGN PATENT DOCUMENTS

| | | | |
|---|---|---|---|
| DE | 3139024 A1 | * | 5/1982 |
| DE | 3150757 A1 | * | 7/1982 |
| EP | 0069271 A2 | * | 1/1983 |
| JP | 62-167025 | * | 7/1987 |

* cited by examiner

*Primary Examiner*—Charles E. Cooley
(74) *Attorney, Agent, or Firm*—Robert W. Becker; Robert W. Becker & Assoc.

(57) ABSTRACT

A pin extruder for conveying polymeric material, especially elastomeric material, comprising a stationary extruder housing and an extruder screw rotatably mounted in the housing. A purality of radially outwardly extending pins are disposed on the extruder screw, at least a portion of which is embodied as a cylinder. The extruder housing, adjacent to the cylinder portion of the extruder screw, is provided with essentially helical conveyor paths and with openings for the pins.

20 Claims, 5 Drawing Sheets

PIN EXTRUDER

This specification for the instant application should be granted the priority date of Oct. 12, 2005, the filing date of the corresponding German patent application 10 2005 048 846.

BACKGROUND OF THE INVENTION

The invention relates to a pin extruder for conveying polymeric material, especially elastomeric material, but also natural rubber.

Such extruders have been successfully used for many years. For example, DE-OS 22 35 784 shows a pin extruder from 1972 that is already adjustable with respect to the radial penetration depth of the pins. The pins extend to the extruder screw and are secured to the housing, whereby screw ribs of the extruder screw are provided with respective openings that enable the pertaining pin to pass through at this axial height.

Although it is often assumed that the greater throughput of such a pin extruder in comparison to an extruder without pins is based on the fact that the rotation flow is obstructed in the screw channel, more recent tests show that the throughput gain results from the increasing relative speed between the fixed pins on the one hand and the rotating screw flanks on the other hand. In practice the extruded material is constantly pushed ahead of the pins and is pushed through the openings in the conveyor ribs in a conveying effective manner and partially in the direction of the extrusion nozzles, and in particular in the portion of the extruded material that is conveyed there and is located downstream.

It is furthermore known to fix the pins on the screw and to this extent to undertake a kinematic exchange. For this purpose, reference is made for example to DE-GM 71 03 071. With this solution, which is intended for double-screw extruders, practically two differently arranged and embodied pin arrangements mesh with one another. A drawback of this is that no conveying effect results, although the mixing effect of these screws is good. On the other hand, this solution is only suitable for double-screw extruders.

A similar solution, which in principle is also suitable for single extruders, is known from DE-OS 26 50 248. With this arrangement, rows of pins extend in the manner of annular grooves that, however, are not continuous but rather are formed by a plurality of inwardly extending projections. Here also there results practically no conveying effect, but a great intermixing, as is desirable for plasticizing and homogenization of the extruded material.

A drawback of the known pin extruders is that a plurality of pins are required, so that the flow channel is greatly narrowed by the pin cross-sections. This produces a very great pressure loss, so that the advantage of the pin extruder with regard to the gain in throughput is again compensated for by the high pressure drop in the pin zone and the thus accompanying loss of throughput.

A number of other forms of pin extruders have also been proposed. Most of the solutions proposed since the beginning of the 70's and partially also realized have pins that extend radially inwardly, in other words proceeding from the extruder housing. Such pins are also partially combined with transfer-mix extruders in order to further improve the thorough mixing of the cold extruded material. However, the problem continues to be the throughput, which remains somewhat below expectations.

It is therefore an object of the present invention to provide a pin extruder that with regard to the ability to thoroughly mix is improved even with very viscous extruded material without adversely affecting the throughput.

SUMMARY OF THE INVENTION

This object is inventively realized by a pin extruder comprising a stationary extruder housing, and an extruder screw rotatably mounted in the housing, wherein a plurality of radially outwardly extending pins are disposed on the extruder screw, wherein at least a portion of the extruder screw is embodied as a cylinder, and wherein the extruder housing, adjacent to the cylinder portion of the extruder screw, is provided with essentially helical conveyor paths and with openings for the pins.

Pursuant to the invention, at least a portion of the extruder screw is embodied as a cylinder, in other words essentially as an outer cylinder. Even though here the term extruder screw is also used for this component, since this component rotates like an extruder screw, it is to be understood that in fact a cylindrical body, in other words a body without spiral conveyor pads and screw ribs or helical ribs, is provided.

Pursuant to the invention, spiral or helical conveyor paths are disposed in the extruder housing, together with openings of the screw ribs such that upon rotation of the extruder screws the pins pass through the openings in the circumferential direction.

It is to be understood that the inventive configuration can extend not only over the entire conveying length of the pin extruder but also only over a portion, for example a forward portion, a central portion or a rear portion of the pin extruder.

Pursuant to the invention, surprisingly a particularly good conveying effect results from the configuration of the pin extruder with pins that are disposed in pin planes and are circulated in openings of the conveyor paths. Apparently the pins respectively push a quantity of extruded material ahead of them in such a way that a greater portion is branched off in the conveying direction before entering into a given opening, and accordingly is helically conveyed in the pertaining conveyor path. Nevertheless, a particularly thorough mixing effect results due to the splitting of the stream of extruded material that is undertaken into each opening at a portion that passes through the opening and a portion that enters the helical conveyor path that follows in the direction of flow.

Pursuant to the invention, the flow cross-section is in no way limited, but rather is even enlarged. Here the invention is advantageous in that the conveying diameter is radially enlarged since the conveyor paths extend in the extruder housing and not in the extruder screw. The conveying length of each conveyor path is thus so to speak automatically increased, so that also a small pressure gradient and hence a larger conveying stream result.

If the extruder is operated at the same rotational speed, there additionally results a higher relative speed between "extruder screw" and housing, thus increasing the conveying effect. Due to the inventively configured openings, there nonetheless results a relatively gentle material division and intermixing, which prevents overheating of the extruded material.

It is particularly expedient pursuant to the invention that the buildup of pressure through the extruder can be effected over a longer conveying path. The pressure difference per unit of length of the extruded material conveyed in a conveying path is thus less, so that a longer pressure build-up zone results.

Pursuant to an advantageous embodiment, the arrangement of the pins, the arrangement of the pin planes, and also the configuration of the pins can individually be adapted to requirements. For example, on the inlet side, more coarse and larger pins can be used in order to ensure an initial intermixing, while the configuration and arrangement of the pin planes and pins in the direction of flow downstream are more fine. The input pin planes can, for example, also comprise pins that are embodied in the manner of posts. Pins having conically tapering sides can, for example, also be used, as can pins that are embodied in a multi-sided manner, for examples as a triangle, as a four-sided object, or as a hexagon. The pins can also, especially in the inlet pin planes, be distributed asymmetrically relative to one another in order to be able to distribute cold and poorly intermixed regions of the extruded material in a particularly good manner.

Pursuant to one embodiment, only a portion of the extruder screw is embodied as a cylinder and only a portion of the extruder housing has conveyor paths, and upstream of this portion the extruder housing is embodied in a conventional manner as an inner cylinder having essentially smooth walls and the extruder screw is provided with spiral conveyor paths.

Pursuant to a particularly advantageous embodiment, the conveyor paths in the extruder housing have a pitch of less than 2, especially approximately 0.8 to 1.6, and preferably approximately 1.2.

Pursuant to a particularly advantageous embodiment, the pins of the cylinder screw respectively extend in a plane and are symmetrically distributed within this plane, whereby in particular 4, 6 or 8 pins are disposed per plane.

Pursuant to a particularly advantageous embodiment, the pins respectively have a circular cross-section and a length-to-diameter ratio of 0.5 to 2, preferably approximately 1.

Pursuant to a particularly advantageous embodiment, the pins extend through essentially the entire radial extension of the conveyor paths and end just, in particular approximately 5 to 10%, before the wall of the extruder housing, relative to the radial height of the conveyor paths.

Pursuant to a particularly advantageous embodiment, a plurality, in particular 2 to 20, preferably 3 to 12, and especially preferred 4 to 8, planes of pins are disposed in an axially successive manner.

Pursuant to a particularly advantageous embodiment, an equal number of pins is disposed on each pin plane, and in particular preferably oriented axially relative to one another.

Pursuant to a particularly advantageous embodiment, the same number of pins is disposed on each plane, whereby the pins are axially offset relative to one another.

Pursuant to a particularly advantageous embodiment, the pins are arranged in a plurality of pin planes, and at least two pin planes have different numbers of pins.

Pursuant to a particularly advantageous embodiment, the number of pins per pin plane increases in the direction of flow.

Pursuant to a particularly advantageous embodiment, the diameter of the pins decreases in successive pin planes as viewed in the direction of flow.

Pursuant to a particularly advantageous embodiment, the arrangement of the pin planes is selected such that the openings in the helical conveyor paths respectively have pins pass through at different points in time.

Pursuant to a particularly advantageous embodiment, the openings respectively have a diameter, as viewed in the circumferential direction, that is 2 to 10%, preferably approximately 4%, greater than the diameter of the pertaining pin.

Pursuant to a particularly advantageous embodiment, each opening has two opening side walls that delimit the conveyor ribs of the helical conveyor paths, and the side walls extend parallel to the direction of rotation of the extruder screw.

Pursuant to a particularly advantageous embodiment, the opening side walls that delimit the openings are rounded off.

Pursuant to a particularly advantageous embodiment, the side walls of the openings are inclined following the direction of flow.

BRIEF DESCRIPTION OF THE DRAWINGS

Further advantages, details and features are provided from the following description of several embodiments of the invention with the aid of the drawings, in which.

DESCRIPTION OF SPECIFIC EMBODIMENTS

Figure 1:
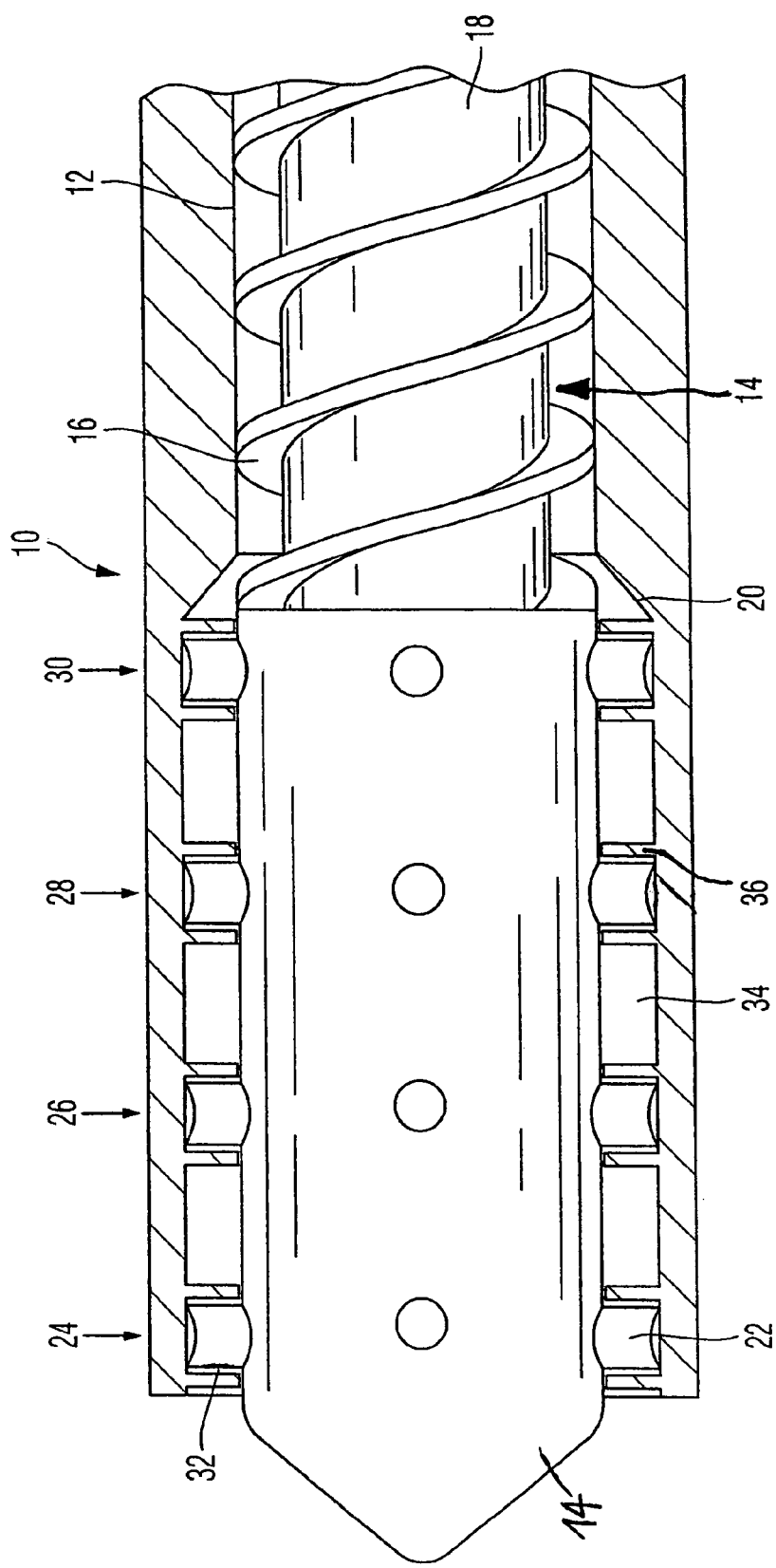
FIG. 1 shows a schematic, partially broken-away view of one embodiment of an inventive pin extruder.

The pin extruder 10 illustrated in FIG. 1 is provided with an extruder housing 12 and an extruder screw 14. In a rearward, upstream portion, the inventive extruder has a classic shape. There, the extruder housing 12 is provided as a hollow cylinder in which an extruder screw extends with helical screw ribs 16 and between them similarly helically extending grooves or conveyor paths 18.

Following this portion, a conically expanding expansion region 20 is provided that enables an increase in diameter for the inventively embodied portion of the pin extruder 10.

There, the extruder screw 16 is embodied in the manner of an outside cylinder, the diameter of which coincides with the outer diameter of the screw ribs 16 of the extruder screw upstream of this portion.

Pursuant to the invention, a plurality of pins 22 proceed or extend from the outside cylinder. The pins 22 extend in four pin planes 24, 26, 28 and 30 in respective openings 32 that are provided in helical conveyor paths 34 in an inventively particular manner. There, the inventive extruder housing 12, in contrast to the upstream region, consequently has an enlarged inner diameter and at that location the helical conveyor paths extend with corresponding helical conveyor ribs 36.

In the illustrated angle of the rotation of the screw conveyor, the respective pins 22 extend through the openings 32. In reality, the distribution of the pin arrangement can preferably be undertaken such that not all of the pins extend through the openings at the same time, but rather at different points in time. This can be easily realized by an appropriate angle offset and makes it possible to reduce or avoid pulsations by a uniform application of pressure.

Whereas in FIG. 1 all of the openings are illustrated as being uniform, it is inventively expedient if the pins have different configurations, whereby for example the pins of the pin plane 30 can have a larger cross-sectional configuration than that illustrated.

It is to be understood that the widths of the openings are respectively adapted to the pins 22; the width of each opening as viewed in the illustration of FIG. 1 is preferably respectively slightly greater than the axial diameter of the pertaining pin.

Figure 2:
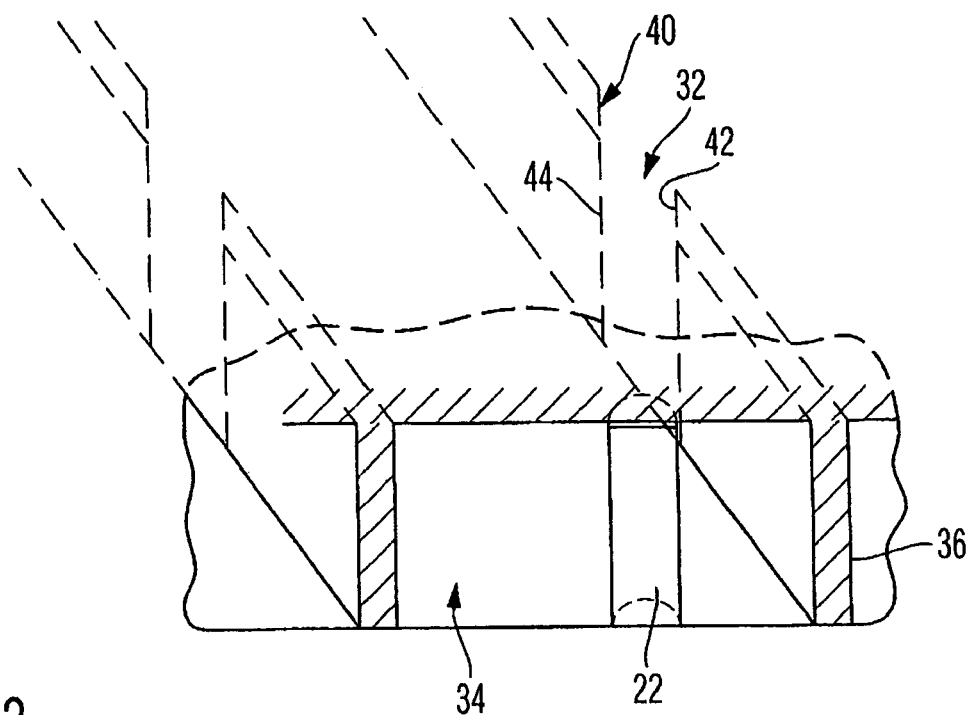
FIG. 2 shows a schematic illustration of a portion of the inventive pin extruder, namely in a development.

FIG. 2 shows a development of a portion of a pin arrangement pursuant to FIG. 1. There, as also in the other figures, the same reference numerals are used for the same parts.

As can be seen, the pin 22 moves in the circumferential direction, as viewed in FIG. 2, such that it passes precisely through the opening 32 in the conveyor rib 36. For this purpose, the opening 32 has a suitable configuration, so that opening side walls 42 and 44 result that extend parallel to the circumferential direction and accordingly are respectively inclined relative to the main direction of the conveyor rib 36. The inclined position angle is a function of the pitch of the conveyor path 34 or conveyor rib 36.

When the pin 22 passes through the opening 32 there respectively laterally results a gap. Pursuant to the invention, this gap is very small. For example, it can be about 5% of the diameter of the pin.

At the acute front or leading edge 44 of the conveyor rib 36, facing the opening 32, the material that is carried along by the pin 22 is in practice split into a first portion that passes through the opening 32, and a larger portion that is deflected in the direction of the conveyor path 34 and hence is conveyed.

Surprisingly, in this way it is possible to achieve a particularly great conveying capacity, whereby it is to be understood that also the shape of the pin can be selected in any desirable suitable manner in order to improve the conveying effect in the direction of the conveyor paths 36.

For example, the pin shape can be selected in the manner of a rhombus, so that the inclined side flank of the pin that faces the conveyor path 36 pushes the extruded material practically laterally at an angle into the conveyor path.

Figure 3:
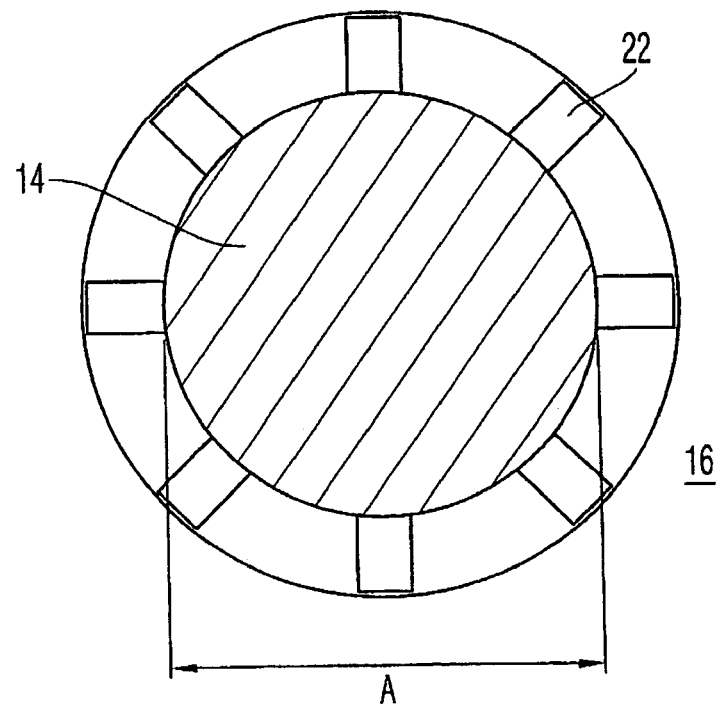
FIG. 3 is a cross-sectional view through a further embodiment of an inventive extruder.

From FIG. 3 it can be seen that the pins 22 can be distributed symmetrically and uniformly about the periphery of the extruder screw 14. Here a total of eight pins assume a portion of the conveying surface. The greater the number of pins, the greater is the conveying effect, but on the other hand the less is the through-flow surface, which again limits the throughput. An adaptation to the requirements can be undertaken over a wide range.

Figure 4:
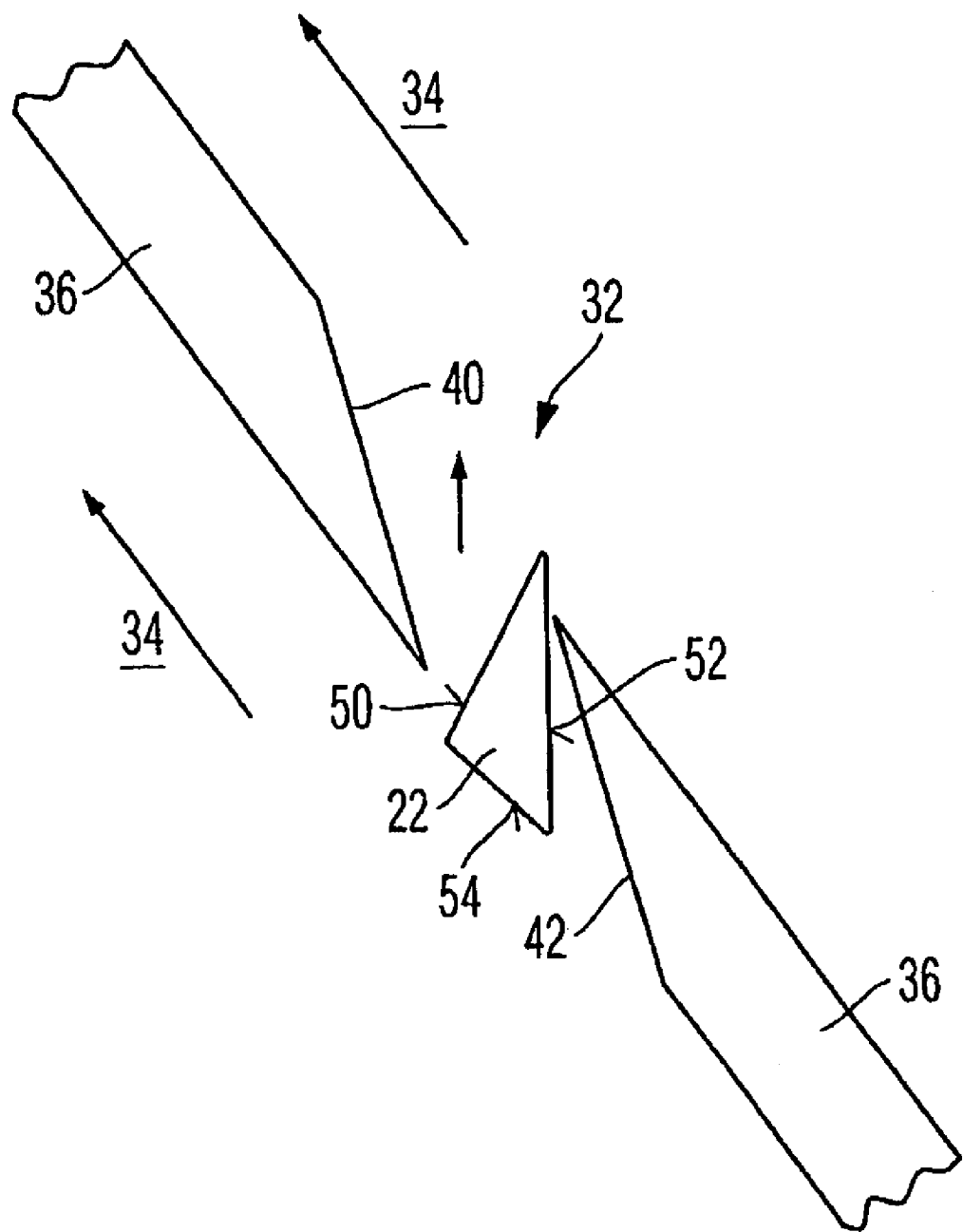
FIG. 4 is a plan view of a portion of a further embodiment of an extruder.
Figure 5:
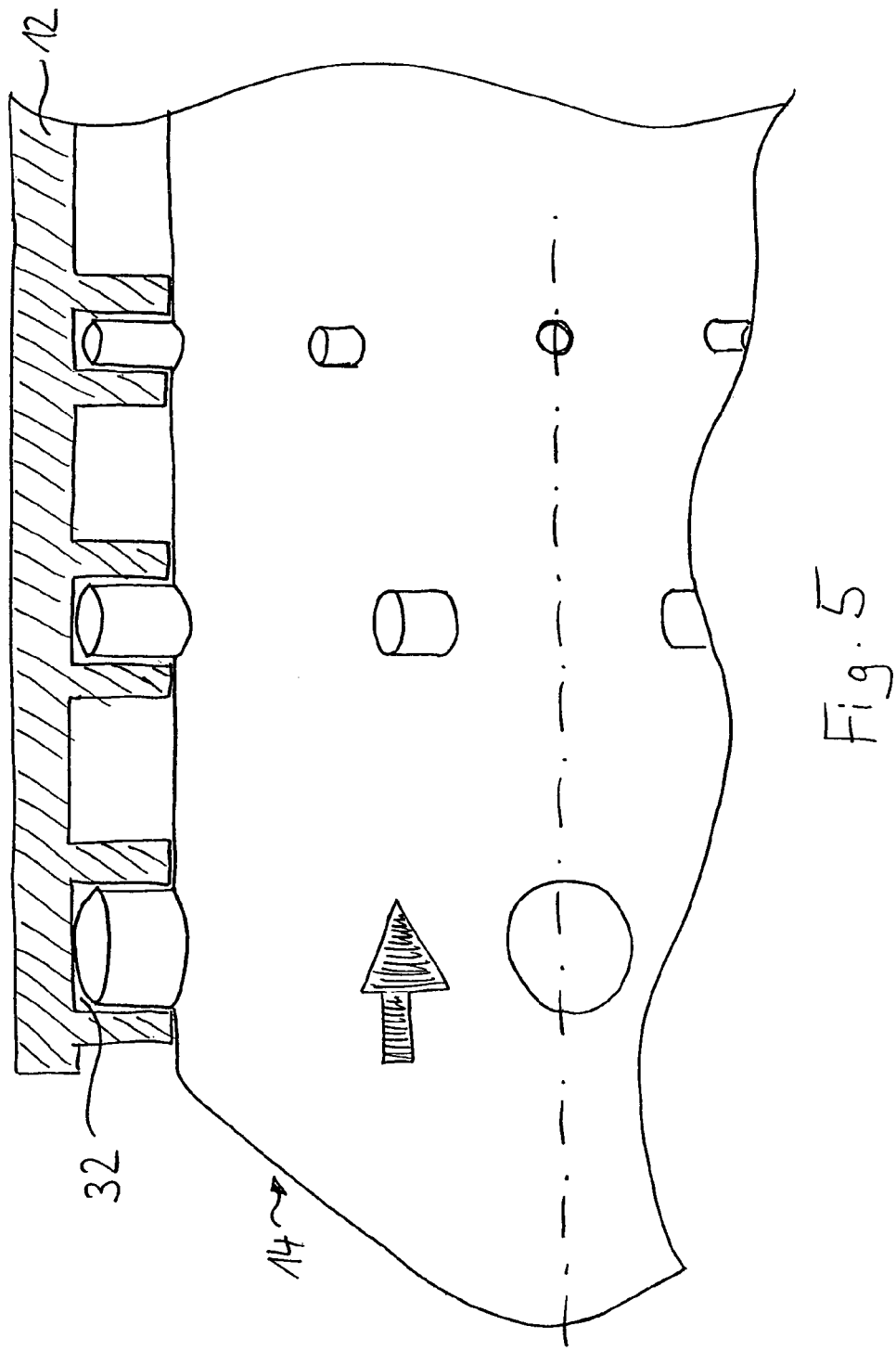
FIG. 5 is a detail view showing the arrangement of the pins.
Figure 6:
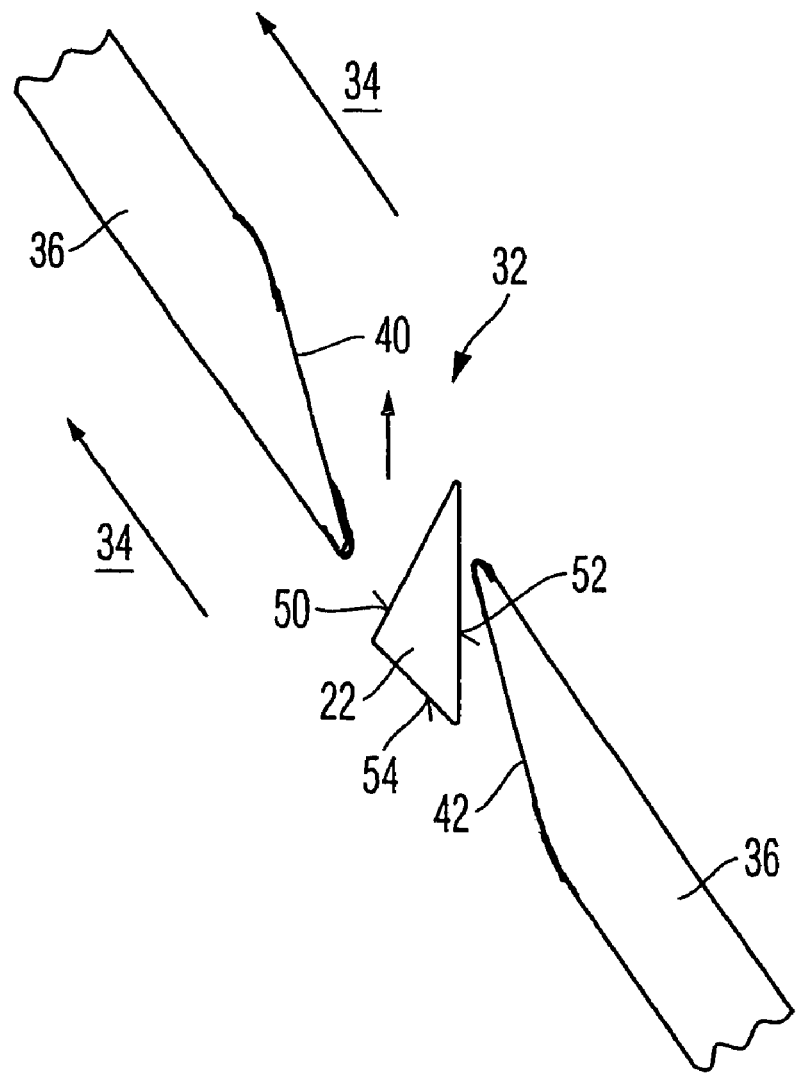
FIG. 6 is an illustration of the rounded-off side walls that define openings.

FIG. 4 shows a modified embodiment of an opening 32 as well as a pin 22. Here also a development is illustrated, whereby the conveyor rib 36 separates the two conveyor paths 34 from one another.

With this embodiment, the opening side walls 40 and 42 are not parallel to the circumferential direction, but rather extend at an angle that is between the angle of the conveyor paths 34 and the circumferential direction. The angle of the conveyor paths and of the conveyor ribs is 35° relative to the circumferential direction, and the inclined position angle of the side walls 40 and 42 is 15° relative to the circumferential direction. It is to be understood that both angles can be adapted over a wide range to the requirements, and it is also possible to provide a radius at the transition between the backside of the conveyor rib 36 and the side wall 40, or the front wall of the conveyor rib 36 and the side wall 42, in order to facilitate flow therearound.

In the illustrated embodiment, the pin 22 is embodied in a special way, namely as a triangle. It has a main conveyor surface 50 that extends at an angle to the circumferential direction, and in particular at an angle of 30°. As a result of this shape, a particularly large portion of the material that is forced by the pin 22 at its periphery is to be introduced into the conveyor path 34. The main conveyor surface 50 therefore extends over the entire width of the pin 22. The pin 22 is furthermore delimited by a side surface 52 that is parallel to the circumference, as well as a rear side surface 54 that can be configured in any desirable suitable manner in order on the one hand to achieve the desired conveying effect, and on the other hand to enable as low a reduction as possible of the free conveying surface for the material being extruded.

It is to be understood that the shapes and embodiments not only of the pin but also of the pertaining conveyor rib can be adapted in any desired manner to the requirements. For example, the conveyor ribs 36 can also have shapes other than a helical shape following the openings 32 in order to further increase the conveying effect.

The specification incorporates by reference the disclosure of German priority document 10 2005 048 846.3 filed Oct. 12, 2005.

The present invention is, of course, in no way restricted to the specific disclosure of the specification and drawings, but also encompasses any modifications within the scope of the appended claims.

The invention claimed is:

1. A pin extruder for conveying polymeric material, comprising:
 a stationary extruder housing; and
 an extruder screw rotatably mounted in said extruder housing, wherein a plurality of radially outwardly extending pins are disposed on said extruder screw, wherein at least a portion of said extruder screw is embodied as a cylinder, and wherein said extruder housing, adjacent to said cylinder portion of said extruder screw, is provided with essentially helical conveyor paths and with openings for said pins.

2. A pin extruder according to claim 1, wherein only a portion of said extruder screw is embodied as a cylinder, wherein only a portion of said extruder housing is provided with said conveyor paths, and wherein upstream of said portions said extruder housing is embodied as an inner cylinder having essentially smooth walls and said extruder screw is provided with spiral conveyor paths.

3. A pin extruder according to claim 1, wherein said conveyor paths in said extruder housing have a pitch of less than 2, in particular approximately 0.8 to 1.6, and preferably approximately 1.2.

4. A pin extruder according to claim 1, wherein said pins are disposed on said cylinder portion of said extruder screw and are disposed in respective planes, and wherein said pins are symmetrically distributed within said planes.

5. A pin extruder according to claim 4, wherein 4, 6 or 8 pins are disposed in each of said planes.

6. A pin extruder according to claim 1, wherein each of said pins has a circular cross-section, and wherein each of said pins has a length-to-diameter ratio of 0.5 to 2, preferably approximately 1.

7. A pin extruder according to claim 1, wherein said pins extend through essentially the entire radial extension of said conveyor paths, and wherein said pins end just short of a wall of said extruder housing relative to a radial height of said conveyor paths.

8. A pin extruder according to claim 7, wherein said pins end approximately 5 to 10% short of the wall of said extruder housing.

9. A pin extruder according to claim 1, wherein a plurality, in particular 2 to 20, preferably 3 to 12 and especially preferably 4 to 8, planes of said pins are arranged in an axially successive manner.

10. A pin extruder according to claim 9, wherein an equal number of said pins is arranged on each of said planes of said pins.

11. A pin extruder according to claim 10, wherein said pins in each of said planes of said pins are oriented axially relative to one another.

12. A pin extruder according to claim 9, wherein an equal number of said pins is arranged on each of said planes of said pins, and wherein said pins are axially offset relative to one another.

13. A pin extruder according to claim 9, wherein a diameter of said pins decreases in successive ones of said planes of said pins as viewed in a direction of flow of material through said extruder.

14. A pin extruder according to claim 9, wherein the arrangement of said planes of said pins is such that said openings in said helical conveyor paths respectively have said pins pass through them at different points in time.

15. A pin extruder according to claim 1, wherein said pins are arranged in a plurality of planes of said pins, and wherein at least two of said planes of said pins have different numbers of said pins.

16. A pin extruder according to claim 15, wherein the number of said pins per plane of said pins increases as viewed in a direction of flow of material through said extruder.

17. A pin extruder according to claim 1, wherein each of said openings has a diameter, as viewed in a circumferential direction, that is 2 to 10%, preferably approximately 4%, greater than a diameter of a pertaining one of said pins.

18. A pin extruder according to claim 1, wherein each of said openings has two opening side walls that delimit conveyor ribs of said helical conveyor paths, and wherein said side walls extend parallel to a direction of rotation of said extruder screw.

19. A pin extruder according to claim 18, wherein said side walls that delimit said openings are rounded off.

20. A pin extruder according to claim 18, wherein said side walls of said openings are inclined following a direction of flow of material through said extruder.

* * * * *